(12) United States Patent
Ludwig

(10) Patent No.: US 8,792,167 B2
(45) Date of Patent: Jul. 29, 2014

(54) PROGRAMMABLE OPTICAL COMPUTING DEVICE EMPLOYING LED ARRAY TRANSDUCERS, NON-QUADRATIC PHASE OPTICAL ELEMENTS, AND STACKED LIGHT MODULATOR ELEMENTS

(71) Applicant: Lester F. Ludwig, Belmont, CA (US)

(72) Inventor: Lester F. Ludwig, Belmont, CA (US)

(73) Assignee: Lester F. Ludwig, San Antonio, TX (US)

( * ) Notice: Subject to any disclaimer, the term of this patent is extended or adjusted under 35 U.S.C. 154(b) by 0 days.

(21) Appl. No.: 14/019,284

(22) Filed: Sep. 5, 2013

(65) Prior Publication Data

US 2014/0002760 A1    Jan. 2, 2014

Related U.S. Application Data

(60) Continuation of application No. 13/450,357, filed on Apr. 18, 2012, now Pat. No. 8,553,329, which is a continuation of application No. 13/049,749, filed on Mar. 16, 2011, now Pat. No. 8,164,832, which is a continuation of application No. 12/560,327, filed on Sep. 15, 2009, now Pat. No. 7,911,698, which is a continuation of application No. 11/929,259, filed on Oct. 30, 2007, now Pat. No. 7,609,447, which is a continuation of application No. 11/294,685, filed on Dec. 5, 2005, now Pat. No. 7,391,570, which is a continuation of application No. 10/656,342, filed on Sep. 4, 2003, now Pat. No. 6,972,905, which is a division of application No. 09/512,781, filed on Feb. 25, 2000, now Pat. No. 6,650,476.

(60) Provisional application No. 60/121,958, filed on Feb. 25, 1999, provisional application No. 60/121,680, filed on Feb. 25, 1999.

(51) Int. Cl.
*G02B 27/46* (2006.01)

(52) U.S. Cl.
USPC ............................ 359/559; 359/558; 359/900

(58) Field of Classification Search
None
See application file for complete search history.

(56) References Cited

U.S. PATENT DOCUMENTS

| 6,650,476 | B1 * | 11/2003 | Ludwig | 359/559 |
| 6,972,905 | B2 * | 12/2005 | Ludwig | 359/559 |
| 7,391,570 | B2 * | 6/2008 | Ludwig | 359/559 |
| 7,609,447 | B2 * | 10/2009 | Ludwig | 359/559 |
| 7,911,698 | B2 * | 3/2011 | Ludwig | 359/559 |
| 8,164,832 | B2 * | 4/2012 | Ludwig | 359/559 |
| 8,553,329 | B2 * | 10/2013 | Ludwig | 359/559 |

* cited by examiner

*Primary Examiner* — Arnel C Lavarias
(74) *Attorney, Agent, or Firm* — Procopio, Cory, Hargreaves & Savitch LLP

(57) ABSTRACT

A monolithic or hybrid integrated optical information processor or optical information processing system having a plurality of non-quadratic phase optical elements, at least one LED array, and plurality of light modulating array elements, each controlled by respective control signals, the system arranged so that each light modulating array element lies in a different plane. In some implementations, at least a portion of the resulting system is implemented in a stack of component materials. In an implementation, an LED array is used as an image source and another LED array is used as an image sensor to transform the processed image into an electrical output.

20 Claims, 3 Drawing Sheets

PROGRAMMABLE OPTICAL COMPUTING DEVICE EMPLOYING LED ARRAY TRANSDUCERS, NON-QUADRATIC PHASE OPTICAL ELEMENTS, AND STACKED LIGHT MODULATOR ELEMENTS

CROSS REFERENCE TO RELATED APPLICATIONS

This application is a continuation of U.S. application Ser. No. 13/450,357, filed Apr. 18, 2012, which is a continuation of U.S. application Ser. No. 13/049,749, filed Mar. 16, 2011, now U.S. Pat. No. 8,164,832, issued on Apr. 24, 2012, which is a continuation of U.S. application Ser. No. 12/560,327, filed on Sep. 15, 2009, now U.S. Pat. No. 7,911,698, issued on Mar. 22, 2011, which is a continuation of U.S. application Ser. No. 11/929,259, filed on Oct. 30, 2007, now U.S. Pat. No. 7,609,447, issued on Oct. 27, 2009, which is a continuation of U.S. application Ser. No. 11/294,685, filed Dec. 5, 2005, now U.S. Pat. No. 7,391,570, issued on Jun. 24, 2008, which is a continuation of U.S. application Ser. No. 10/656,342, filed Sep. 4, 2003, now U.S. Pat. No. 6,972,905, issued on Dec. 6, 2005, which is a divisional of U.S. application Ser. No. 09/512,781 filed Feb. 25, 2000, now U.S. Pat. No. 6,650,476, issued on Nov. 18, 2003, which claims benefit of priority from U.S. Provisional Application Ser. Nos. 60/121,958 and 60/121,680, each filed on Feb. 25, 1999. The provisional applications are incorporated in their entirety herein.

BACKGROUND OF THE INVENTION

1. Field of Invention

This invention relates to optical signal processing, and more particularly to the use of fractional Fourier transform properties of lenses with traditional non-phase-shifting optical elements within traditional Fourier optical signal processing environments to realize, or closely approximate, arbitrary non-positive-definite transfer functions. The system and method herein can be applied to conventional lens-based optical image processing systems as well as to systems with other types of elements obeying Fractional Fourier optical models and as well to widely ranging environments such as integrated optics, optical computing systems, particle beam systems, radiation accelerators, and astronomical observation methods.

2. Discussion of the Related Art

A number of references are cited herein; these are provided in a numbered list at the end of the Detailed Description. These references are cited as needed through the text by reference number(s) enclosed in square brackets. Further, the cited disclosure contained within reference [1-19] is hereby incorporated by reference.

The Fourier transforming properties of simple lenses and related optical elements is well known and heavily used in a branch of engineering known as "Fourier Optics" [1, 2]. Classical Fourier Optics [1, 2, 3, 4] allows for flexible signal processing of images by (1) using lenses or other means to take a first two-dimensional Fourier transform of an optical wavefront, thus creating at a particular spatial location a "Fourier plane" wherein the amplitude distribution of an original two-dimensional optical image becomes the two-dimensional Fourier transform of itself, (2) using a translucent plate or similar means in this location to introduce an optical transfer function operation on the optical wavefront, and (3) using lenses or other means to take a second Fourier transform which, within possible scaling and orientation differences, amounts to the convolution of the impulse response corresponding to the optical transfer function with the original image. In this way images can be relatively easily and inexpensively lowpass-filtered (details softened) and highpass-filtered (details enhanced) as well as multitude of other possibilities. These multitudes of possibilities have, due to properties of materials and fabrication limitations in transcending them, been limited to transfer functions that mathematically are "positive-definite;" that is, those which affect only amplitude and do not introduce varying phase relationships.

The Fractional Fourier transform has been independently developed several times over the years [5, 7, 8, 9, 10, 14, 15] and is related to several other mathematical objects such as the Bargmann transform [8] and the Hermite semigroup [13]. As shown in [5], the most general form of optical properties of lenses and other related elements [1, 2, 3] can be transformed into a Fractional Fourier transform representation. This fact, too, has been apparently independently rediscovered some years later and worked on steadily ever since (see for example [6]) expanding the number of optical elements and situations covered. It is important to remark, however, that the lens modeling approach in the later long ongoing series of papers view the multiplicative-constant phase term in the true farm of the Fractional Fourier transform as a problem or annoyance and usually omit it from consideration; this is odd as, for example, it is relatively simple to take the expression for lenses from [2] and repeat the development in [5] based on the simplified expression in [1] and exactly account for this multiplicative-constant phase term.

SUMMARY OF THE INVENTION

A principal aspect of this invention is the use of Fractional Fourier transform properties of lenses or other optical elements or environments to introduce one or mare positive-definite optical transfer functions at various locations outside the Fourier plane so as to realize, or closely approximate, arbitrary non-positive-definite transfer functions. Specifically this aspect of the invention encompasses an optical system for realizing optical filtering through the use of at least one optical element outside the Fourier transform plane. By choice of the number of such elements, position of such elements, and the actual positive-definite transfer function used for each element, arbitrary non-positive-definite transfer functions can be approximated by the entire system, and designs can be straightforwardly obtained by methods of approximation. However, there are several additional aspects to the invention relating to implementing, expanding, or utilizing this underlying aspect.

An intimately related aspect of the invention relates to realizations of the optical filtering effects of non-positive-definite optical transfer functions through the use of at least one positive-definite optical element outside the Fourier transform plane. The invention thus includes cases where only positive-definite optical elements are used to realize non-positive-definite optical transfer functions.

An additional aspect of the invention pertains to embodiment designs which can be straightforwardly obtained by methods of mathematical function approximation. An exemplary approximation method provided for in the invention leverages Hermite function expansions of the desired transfer function. This is advantageous in simplifying the approximation problem as the orthogonal Hermite functions diagonalize the Fourier transform and Fractional Fourier transform; the result is two-fold:

throughout the entire optical system the amplitude and phase affairs of each Hermite function are completely independent of those of the other Hermite functions the Hermite function expansion of a desired transfer function will naturally have coefficients that eventually tend to zero, meaning that to obtain an arbitrary degree of approximation only a manageable number of Hermite functions need be handled explicitly.

Another aspect of the invention involves the determination of the position and/or amplitude distribution of a positive-definite optical element through use of the fractional Fourier transform.

Another aspect of the invention involves the determination of the position and/or amplitude distribution of a positive-definite optical element through use of Hermite function expansions, with or without approximations.

Another aspect of the invention relates to the use of at least one programmable light modulator as an optical element.

Another aspect of the invention relates to use of the invention to perform general optical computing functions, explicitly including those involving complex arithmetic.

Another aspect of the invention provides for realization of embodiments utilizing integrated optics, including monolithic or hybrid fabrication involving photolithography and/or beam-controlled fabrication methods.

Another aspect of the invention provides for multiple channel configurations which can be used, for example, in visual-color image processing or wide-spectrum image processing.

Another aspect of the invention provides for replacing one or mote non-positive-definite filter elements in the principal and related aspects of the invention with one or more controllable optical phase shift elements, most generally in array form.

Another aspect of the invention uses the above variation (employing one or more controllable optical phase shift elements) to synthesize controllable lens and lens system functions such as controllable zoom and focus.

[Another aspect of the invention provides for adapting the entire mathematical, method, and apparatus framework, so far built around the fractional Fourier transform operation and associated Hermite basis functions, to related mathematical transform operations associated with different basis functions that would arrive from non-quadratic graded-index media and/or environments.

The system and method herein can be applied to conventional lens-based optical image processing systems as well as to systems with other types of elements obeying Fractional Fourier optical models and as well to widely ranging environments such as integrated optics, optical computing systems, particle beam systems, radiation accelerators, and astrological observation methods.

The incorporation of the method of the invention with classical, contemporary, and future methods of Fourier optics has significant synergistic value in attaining simple low-cost realizations of optical linear signal processing with non-positive definite transfer functions. Conventional methods for the creation of means for introducing positive-definite (amplitude variation without phase variation) optical transfer functions can be readily used in fabrication and conventional approximation methods can be used in transfer function design. Through use of Hermite function expansions, as used in one embodiment of the method, interaction of terms is minimized and only a manageable number of terns need be handled explicitly.

BRIEF DESCRIPTION OF THE DRAWINGS

The above and other aspects, features and advantages of the present invention will become more apparent upon consideration of the following description of preferred embodiments taken in conjunction with the accompanying drawing figures, wherein.

DETAILED DESCRIPTION OF THE PREFERRED EMBODIMENTS

The invention is concerned with processing presented image data, either recorded or real-time provided by an exogenous system, means, or method. This image data can be presented by means of an electronic display (such as an LCD panel, CRT, LED array, or other technologies), films, slides, illuminated photographs, or the output of some exogenous system such as an optical computer, integrated optics device, etc. The presented image data will herein be referred to as the image source. The invention is also concerned with image data then produced by the invention which is presented to a person, sensor (such as a CCD image sensor, photo-transistor array, etc.), or some exogenous system such as an optical computer, integrated optics device, etc. The latter image presentation receiving entity will herein be referred to as a observer, image observation entity, or observation entity.

Figure 1:
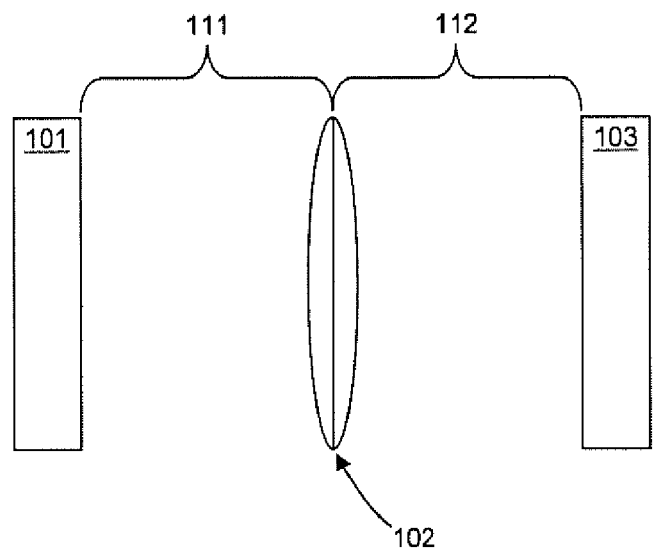
FIG. 1 shows a general arrangement involving an image source, lens or lens system or other equivalent, and an image observation entity, capable of classical geometric optics, classical Fourier optics, and fractional Fourier transform optics.

FIG. 1 shows a general arrangement involving an image source 101, lens or lens system or other equivalent 102, and an image observation entity 103, capable of classical geometric optics, classical Fourier optics, and fractional Fourier transform optics. The class of optics (geometric, Fourier, or fractional Fourier) is determined by the following:

the separation distances 111 and 112 the "focal length" parameter "f" of the lens or lens system or other equivalent 102.

the type of image source (lit object, projection screen, etc.) in so far as whether a plane or spherical wave is emitted.

As is well known, the cases where the source image is a lit object and where the distances 111, which shall be called "a", and 112, which shall be called "b," fall into the "lens-law relationship" determined by the focal length f:

$$\frac{1}{f} = \frac{1}{a} + \frac{1}{b} \tag{1}$$

gives the geometric optics case. In this case the observed image 103 is a vertically and horizontally inverted version of the original image from the source 101 scaled in size by a magnification factor "m" given by:

$$m = \frac{b}{a} \quad (2)$$

The Fourier transforming properties of simple lenses and related optical elements is also well known and heavily used in a branch of engineering known as "Fourier Optics" [2,3]. Classical Fourier Optics [2, 3, 4, 5] involves the use of a lens, lens-systems, or other means to take a first two-dimensional Fourier transform of an optical wavefront, thus creating at a particular spatial location a "Fourier plane" wherein the amplitude distribution of an original two-dimensional optical image becomes the two-dimensional Fourier transform of itself. In the arrangement of FIG. 1 with a lit object serving as the source image 101, the Fourier optics case is obtained when a=b=f. In this way, classical Fourier Optics [2, 3, 4, 5] allows for easy, inexpensive, flexible signal processing of images.

Figure 2:
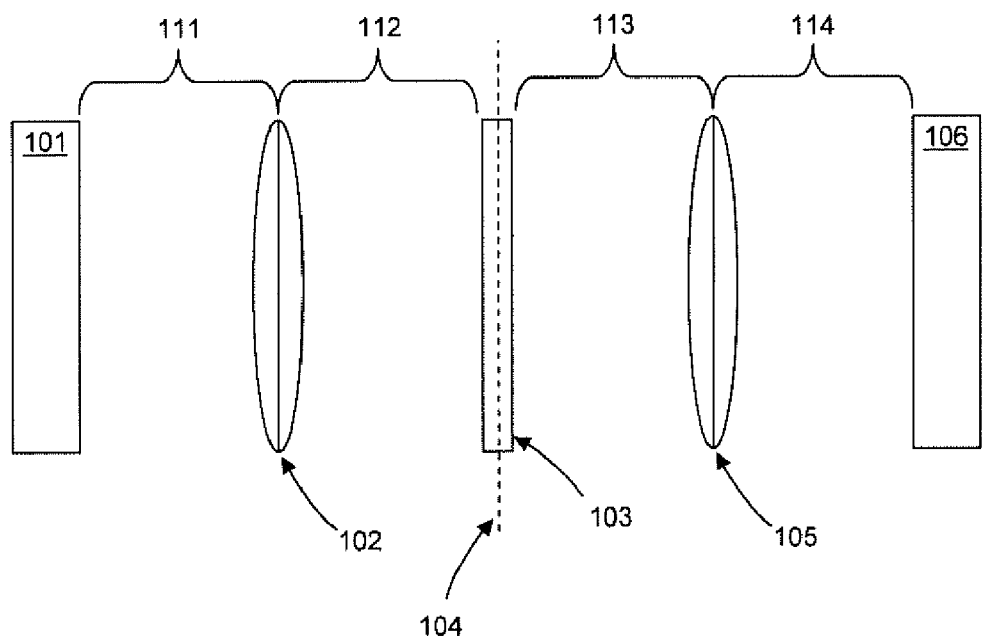
FIG. 2 shows a Classical Fourier Optics image processing arrangement with an optical transfer function element introduced in the Fourier plane, using two lenses to realize the Fourier plane.

FIG. 2 shows a Classical Fourier Optics image processing arrangement with an optical transfer function element 103 introduced in the Fourier plane 104, using two lenses 102, 105 to realize the Fourier plane 104. The optical transfer function element 103 is typically implemented via a translucent plate or similar means in this location to introduce an optical transfer function operation on the optical wavefront. The image source 101 and a first lens 102 are separated by a distance 111 which, based on the focal length of the lens, creates a Fourier plane 104 at a distance 112 on the opposite side of the first lens 102. The image source 102 may be natural image (as with a camera), produced by an optoelectric transducer, or some other type of image source element. A second lens 105 is positioned a distance 113 from the Fourier plane on the plane's opposite side. The distance 113 is selected, based on the focal length of the second lens 105, together with distance 114 so that an observation element 106 receives a Fourier transform of the image emanating from the Fourier plane 104. The observation element 106 may be natural (such as a viewfinder, display surface, projection screen, or other means), optoelectric (as in a phototransistor or CCD array or other means), or some other type of observing element.

As an aside, note that if the translucent plate is perfectly clear so as to effectively not be present, the result is the composition of two Fourier transform operations; since an inverse Fourier transform is a Fourier transform with its transform variable replaced with its negative, the composition of two Fourier transforms amounts to reversing the image coordinates, i.e., flipping the image up for down and left for right, the result expected for a compound lens. Further, the distances 111, 112, 113, 114 to give these effects are not unique; alternate distance selections result in variations in image size, which amounts to varying the magnification power of a compound lens and hence the image size.

Within then possible scaling and flipped-image orientation differences, the above arrangements amount to the convolution of the impulse response corresponding to the optical transfer function with the original image. The same results can be obtained in other optical arrangements and with alternate types of elements, either of which may obey the same mathematical relationships. In this way images can be relatively easily and inexpensively lowpass-filtered (details softened) and highpass-filtered (details enhanced) as well as multitude of other possibilities.

These multitudes of possibilities have, due to properties of materials and fabrication limitations in transcending them in the construction of the transform element 105, been limited to transfer functions that mathematically are "positive-definite," i.e. those which affect only amplitude and do not introduce varying phase relationships.

The apparatus and method of this invention utilizes Fractional Fourier transform [5, 7, 8, 9] properties of lenses [5, 6] or other means to introduce one or more positive-definite optical transfer functions at various locations outside the Fourier plane to realize, or closely approximate, arbitrary non-positive-definite transfer functions. The Fractional Fourier transform properties of lenses cause complex but predictable phase variations to be introduced by each such located conventional positive-definite (i.e., amplitude variation without phase variation) optical linear transfer function elements. By choice of the number of such elements, position of such elements, and the actual positive-definite transfer function used for each element, arbitrary non-positive-definite transfer functions can be approximated by the entire system. This is now explained in more detail below.

As described in [5], for cases where a, b, and f do not satisfy the lens law of the Fourier optics condition above, the amplitude distribution of the source image 101 as observed at the observation entity 103 experiences in general the action of a non-integer power of the Fourier transform operator. As described in [5], this power, which shall be called α, varies between 0 and 2 and is determined by an Arccosine function dependent on the lens focal length and the distances between the lens, image source, and image observer, specifically as $$\alpha = \frac{2}{\pi} \arccos\left[\operatorname{sgn}(f-a)\frac{\sqrt{(f-a)(f-b)}}{f}\right] \quad (3)$$

for cases where (f−a) and (f−b) share the same sign. There are other cases which can be solved for from the more primitive equations in [5] (at the bottom of pages ThE4-3 and ThE4-I). Note simple substitutions show that the lens law relationship among a, b, and f indeed give a power of 2 and that the Fourier optics condition of a=b=f give a power of 1, as required.

Figure 3:
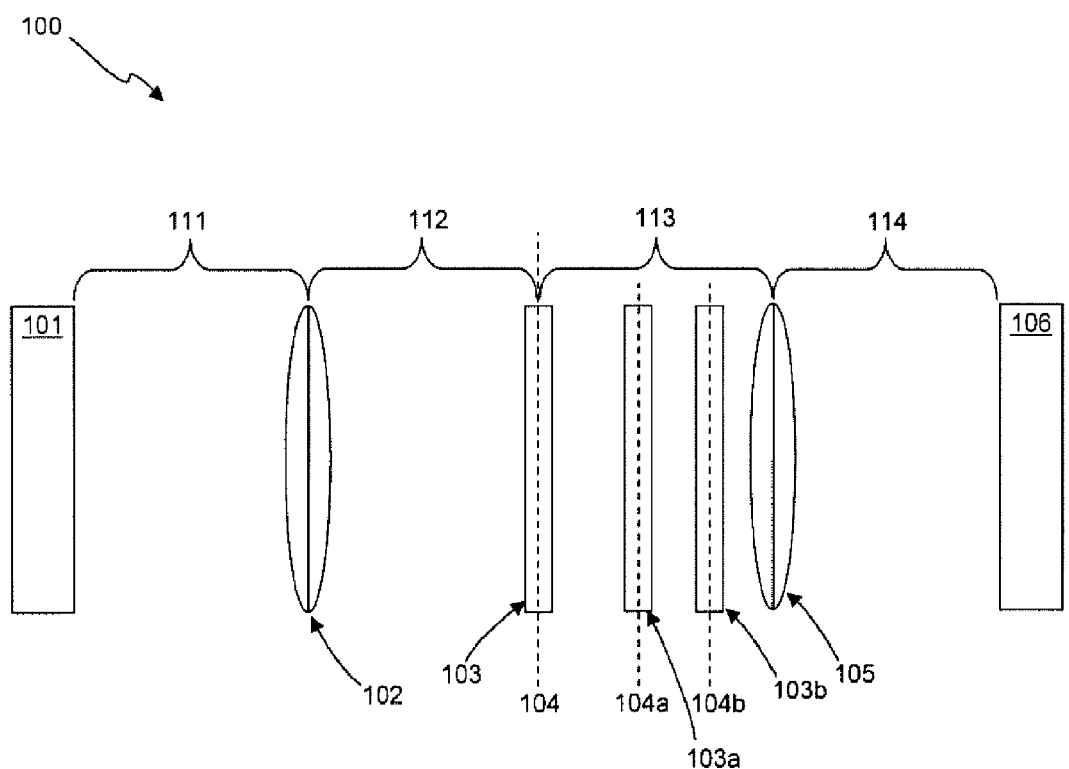
FIG. 3 shows optics device 100 providing the exemplary introduction of two additional optical transfer function elements introduced outside the Fourier plane.

Without loss of generality to other implementations, FIG. 3 shows the exemplary realization of the invention introducing additional (or alternate) optical transfer function elements, here exemplified as 103a and 103b, introduced at additional (or alternate) locations, here exemplified as 104a and 104b, in a region outside the Fourier plane, here exemplified with region 113. It is understood that, depending on the desired transfer function to be realized with what degree of accuracy, arbitrary numbers of optical transfer function elements such as 103a and 103b could be located in any one or more of the regions 111, 112, 113, 114, and in fact the system may include or not include an element 103 in the Fourier plane 104. Designs can be straightforwardly obtained by methods of approximation [11, 12].

One embodiment of the approximation method leverages Hermite function [16] expansions [17, and more recently, 18] of the desired transfer function. This is advantageous in simplifying the approximation problem as the orthogonal Hermite functions diagonalize the Fourier transform [17] and Fractional Fourier transform [5, 9]; the result is two-fold:

throughout the entire optical system the amplitude and phase affairs of each Hermite function are completely independent of those of the other Hermite functions the Hermite function expansion of a desired transfer function will naturally have coefficients that eventually tend to zero, meaning that to obtain an arbitrary degree of approximation only a manageable number of Hermite functions need be handled explicitly.

Because of these properties it is simplest to explain the properties of the Fractional Fourier transform on the image in terms of the Hermite function representation. It is understood that other methods for representing properties of the Fractional Fourier transform on an image as well as for approximation methodology are possible.

A bounded (non-infinite) function k(x) can be represented as an infinite sum of Hermite functions $\{h_n(x)\}$ as:

$$k(x) = \sum_{n=0}^{\infty} a_n h_n(x) \tag{4}$$

Since the function is bounded the coefficients eventually become small and converge to zero. An image is a two dimensional entity, as is the amplitude variation of a translucent plate; in either case the function can be represented in a two-dimensional expansion:

$$k(x_1, x_2) = \sum_{m=0}^{\infty} \sum_{n=0}^{\infty} a_{n,m} h_n(x_1) h_m(x_2) \tag{5}$$

For simplicity, consider the one-dimensional case. The Fourier transform action on Hermite expansion of the function k(x) with series coefficients $\{a_n\}$ is given by [16]:

$$F[k(x)] = \sum_{n=0}^{\infty} (-i)^n a_n h_n(x) \tag{6}$$

Because of the diagonal eigenfunction structure, fractional powers of the Fourier transform operator can be obtained by taking the fractional power of each eigenfunction coefficient. The eigenfunction coefficients here are $(-i)^n$. Complex branching artifact ambiguities that arise from taking the roots of complex numbers can be avoided through writing −i as $$e^{-i\pi/2} \tag{7}$$

Thus, for a given power α, the Fractional Fourier transform of the Hermite expansion of the function k(x) with series coefficients $\{a_n\}$s given by [5]:

$$F^\alpha[k(x)] = \sum_{n=0}^{\infty} e^{in\pi\alpha/2} a_n h_n(x) \tag{8}$$

Thus as the power a varies with separation distance (via the Arccosine relationship depending on separation distance), the phase angle of the nth coefficient of the Hermite expansion varies according to the relationship shown above. When α=1 the result is the traditional Fourier transform. The effect of the Fourier plane on positive-definiteness is clear: with α=1 the complex exponential is always either i, −i, 1, or −1 since n is an integer and with the $\{a_n\}$ all in the unit interval [0,1] there is no way to do anything with phase relationships. If α is not an integer then nα in general is not, and thus the complex exponential can attain other values not on the unit circle.

Referring now to the arrangement of FIG. 3, the above relationship can be used in sequence to calculate the phase contributions at each optical transfer function element 103a, 103b, etc. as well as any element in the Fourier plane 104:

- The distances between the elements can be used to calculate the power of the Fractional Fourier transform at the element location
- These powers are used to determine the phase variation introduced by that element
- The composite effect of all optical transfer function elements in the system can then be calculated. The phase shift introduced by N optical transfer function elements for image expansion coefficient $f_{n,m}$ and optical transfer function element expansion coefficients $t^1_{n,m} \ldots t^N_{n,m}$ with separation distances determining Fractional Fourier transform powers $\alpha_1, \ldots, \alpha_N$ is:

$$\left(\prod_{j=1}^{N} t^j_{n,m}\right) e^{[(-in\pi/2)\sum_{j=1}^{N} \alpha_j]} \tag{9}$$

Approximation methods can then be used, based on a very small but sufficiently rich collection of easily implemented optical transfer function elements and a convenient range of separation distances dictated by physical considerations.

A class of system embodiments of special interest provided for by the invention are those where a sequence or physically-adjacent stack of programmable light modulators, such as LCD panels, are used as the optical transfer function elements. Electrical and/or computer and/or, with future materials, optical control could then be used to alter the individual transfer function of each optical transfer function element. The latter arrangement could be implemented as an integrated optics device, perhaps including storage capabilities to storage the transfer function pixel arrays and perhaps even an associated processor for computing the individual optical transfer function element transfer function pixel arrays. The result is a powerful, relatively low-cost, potentially high-resolution real-time integrated optics image processor which would perform optical transformations otherwise requiring many vast orders of magnitudes of computation power. Further, the image source and observation elements may in fact be optoelectric transducers (LED arrays, LCDs, CCDs, CRTs, etc.) and may be further integrated into a comprehensive system which can further be abstracted into a more general purpose complex-number arithmetic optical computing array processor of tremendous processing power. The invention provides for the range of these integrated optical processor architectures to readily implemented through photolithography or beam-controlled fabrication methods.

Returning to the image processing application, such an integrated optics image processor could be realized for monochrome, visual color, or wide-spectrum images depending on the systems architecture and/or the components used. For example, a visual color image processor could be realized by three monochrome image processing subsystems as described above, each monochrome image processing subsystems dedicated to one of the three visual color components (i.e., "red," "green," and "blue") as is commonly done in videographics and digital image processing systems. Alternatively, color LCD panels may be used as the optical transfer function elements, allowing a single image processing system as described in the previous paragraph to simultaneously process the entire visual range. Both of these system and method approaches may also be used for wide-spectrum images: a wide-spectrum image may be decomposed into multiple optical frequency bands which are processed separately (and potentially, though not necessarily, recombined), or wide-spectrum LCD optical transfer function elements can be used in a single channel system.

It is noted that the multichannel system has the additional wide-spectrum advantage of permitting different materials to be used in each spectral band, thus allowing choices of materials each best matched for its associated band. It is also noted that another wide-spectrum advantage of the multichannel system is that splitting the spectrum potentially allows for approximate wavelength-dependent dispersion corrections and/or control. Yet another wide-spectrum advantage of the multichannel system is that splitting the spectrum potentially allows for separate detector areas far each wavelength band, having potential applications in astronomical observation sensors and wavelength-division multiplexing. Finally, it is noted that both dispersion compensation/control and separate detector partitions can be served with a large plurality of wavelength-partitioned channels readily implemented through photolithography or beam-controlled fabrication of the integrated optical processor.

Before continuing with additional aspects of these several types of integrated apical processors, it is noted that the systems and methods described herein can be applied to conventional lens-based optical image processing systems as well as to systems with other types of elements obeying Fractional Fourier optical models and as well to widely ranging environments such as integrated optics, optical computing systems, particle beam systems, radiation accelerators, and astronomical observation methods.

In particular it is noted that an important class of optical systems obeying Fractional Fourier optical models are graded-index optical materials (such as optical fibers), in particular quadratic graded-index media. It is therefore noted that graded index materials can be used in the fabrication of the integrated optical processors described above, removing the need for any lenses. This allows further design options in the creation of both monolithic and hybrid physical realizations and fabrication of the integrated optical processors described above.

Figure 4:
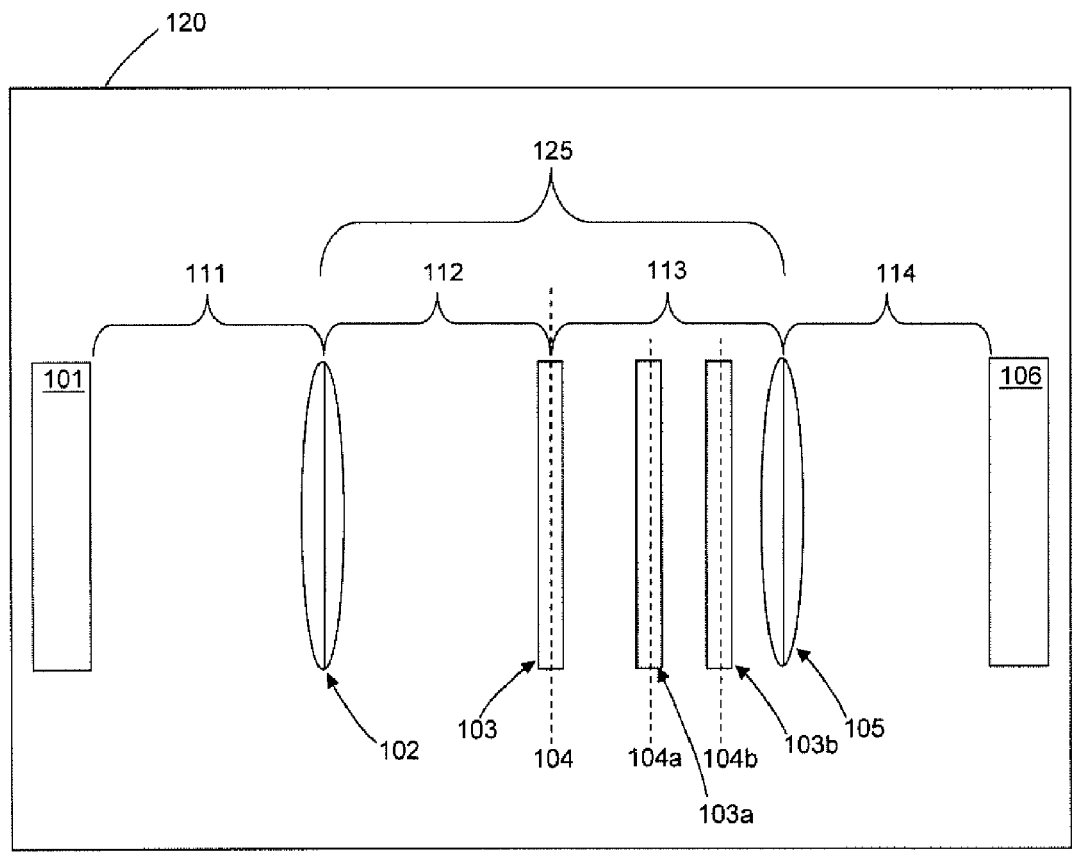
FIG. 4 shows optics device 100 of FIG. 3 implemented as a monolithic optics device.
Figure 5:
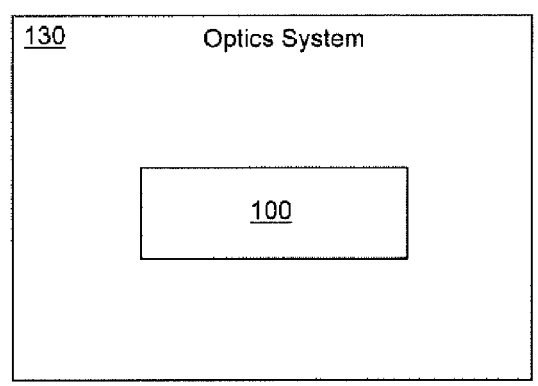
FIG. 5 shows optics device 100 of FIG. 3 integrated with an optics system.

For instance, FIG. 4 shows the optics device of FIG. 3 configured as a monolithic device 120 providing optical filtering according to various techniques disclosed herein. One alternative is to omit image source 101 and image observation element 106, resulting in optics device 125. If desired, as shown in FIG. 5, optics device 100 may be implemented within optics system 130, thus defining an integrated optics system according to an implementation of the present invention.

It is next noted that the entire systems and methods developed thus far can now be generalized away from the Fractional Fourier transform and its associated Hermite function basis and quadratic phase characteristics. For example, the integrated optical processor can, as just mentioned, be implemented with graded-index materials. To realize the Fractional Fourier transform and its associated Hermite function basis and quadratic phase characteristics in the development so far, quadratic graded-index media must be used. If instead non-quadratic graded-index media are used, a similar but different mathematical framework can in general be employed: the Hermite functions will be replaced with a different set of basis functions affiliated with the graded-index profile, and the Fractional Fourier transform will be replaced by a different operation affiliated with these replacement basis functions. This approach can prove important and advantageous in mass production as specific types of non-quadratic graded-index media may be found to more readily lend themselves to the fabrication of the same general form integrated optical processor architectures described above, as well as related ones.

Finally, returning now to the original Fractional Fourier transform approach and framework, note that it is also possible to effectively turn the original purpose of the framework on its head and admit controllable filtering elements that are indeed non-positive-definite in their transfer function, i.e., shifting the phase of the light. Such controllable optical phase-shifting filter elements may be, for example, realized as two-dimensional arrays of twisting liquid crystals or other electronically controllable optical material which varies the phase of transmitted light, for example, by changing its intrinsic optical properties such as its index of refraction, and/or changing the effective propagation length of the transmitted light, or by yet other methodologies.

One case of an optical image processing or computation system involving this technology would involve electronically controllable optical phase-shifting filtering element arrays which can only vary the transmitted light phase over some range, perhaps a small one. A larger phase variation is therefore possible if a plurality of such arrays are ganged, i.e., either stacked together or distributed in space. In general this will result in some or all of the arrays to lie outside the Fourier plane, particularly if the overall optical system incorporating this array plurality is physically compact. The mathematical framework described earlier for calculating the overall transfer function assuming positive-definite optical filter elements can be used directly: the phase perturbations made possible by each phase-controllable element are incorporated by simply substituting the real-valued array parameters with complex-valued ones as is familiar in the common art of signal processing. The resulting mathematical expressions are then usable for transfer function synthesis as described earlier, but now with the additional degrees of freedom associated with the phase control made possible by these elements.

A particularly useful application of this would be to use only all-pass phase-variable elements in a compound optical system set up to operate as an electronically adjustable lens. By varying the phase-shifts of the all-pass filter elements, the Fractional Fourier transform effects of a lens of varying focal length and/or varying separation distance from the affiliated optics can be synthesized. Various compound optics arrangements can therefore be made utilizing this electronically controlled synthesis of effective focal length and/or varying separation distance. One important application would be the creation of an electronically adjustable lens with variable focus and variable zoom capabilities. The latter is a straightforward application of the electronically controlled variable phase-shift aspect of the invention.

Conventional optics rely on varying physical separation distances of movable optical elements to realize zoom and focus effects, thus the electronically controlled variable phase-shift realization of the invention would simply replace one or more such moving optical elements. Particularly useful is an arrangement where the electronically controllable optical phase-shifting filter elements involve no moving parts, thus allowing electronically controllable variable focus and variable zoom capabilities to be realized with no moving parts. Not only will this replace the need for today's extensive precision optics and precision mechanics, but the resulting optical effects can be made very precise and operate with fast dynamics. Because twisting liquid crystals today operate at full contrast at video rates (30 Hz), variations in zoom and focus would be executable in ~30 msec or less. Further, with the addition of electronic image sources and detectors on either side of the controllable optical phase-shifting filter element arrays, the more general purpose complex-number optical computing array processor of tremendous processing power described earlier may also be fabricated with an optical architecture similar to the electronically variable lens just described. Finally, it is noted that as material methods advance, the invention provides for the variable phase elements described above to be controlled optically in part or whole rather than exclusively electrically.

All publications and patent applications mentioned in this specification are herein incorporated by reference to the same extent as if each individual publication or patent application was specifically and individually indicated to be incorporated by reference. The invention now being fully described, it will be apparent to one of ordinary skill in the art that many changes and modifications can be made thereto without departing from its spirit or scope.

REFERENCES CITED

The following references are cited in this patent application:
[1] L. Levi, *Applied Optics, Volume* 2 (Section 19.2), Wiley, New York, 1980.
[2] J. W. Goodman, *Introduction to Fourier Optics*, McGraw-Hill, New York, 1968.
[3] K. Iizuka, *Engineering Optics*, Second Edition, Springer-Verlag, 1987.
[4] A. Papoulis, *Systems and Transforms with Applications in Optics*, Krieger, Malabar, Florida, 1986.
[5] L. F. Ludwig, "General Thin-Lens Action on Spatial Intensity (Amplitude) Distribution Behaves as Non-Integer Powers of Fourier Transform," *Spatial Light Madidators and Applications Conference*, South Lake Tahoe, 1988.
[6] R. Dorsch, "Fractional Fourier Transformer of Variable Order Based on a Modular Lens System," in *Applied Optics*, vol. 34, no. 26, pp. 6016-6020, September 1995.
[7] E. U. Condon, "Immersion of the Fourier Transform in a Continuous Group of Functional Transforms," in *Proceedings of the National Academy of Science*, vol. 23, pp. 158-161, 1937.
[8] V. Bargmann, "On a Hilbert Space of Analytical Functions and an Associated Integral Transform," *Comm. Pure Appl. Math*, Volume 14, 1961, 187-214.
[9] V. Namias, "The Fractional Order Fourier Transform and its Application to Quantum Mechanics," in *J. of Institute of Mathematics and Applications*, vol. 25, pp. 241-265, 1980.
[10] B. W. Dickinson and D. Steiglitz, "Eigenvectors and Functions of the Discrete Fourier Transform," in *IEEE Transactions on Acoustics, Speech, and Signal Processing*, vol. ASSP-30, no. 1, February 1982.
[11] F. H. Kerr, "A Distributional Approach to Namias' Fractional Fourier Transforms," in *Proceedings of the Royal Society of Edinburgh*, vol. 108A, pp. 133-143, 1983.
[12] F. H. Kerr, "On Namias' Fractional Fourier Transforms," in *IMA J. of Applied Mathematics*, vol. 39, no. 2, pp. 159-175, 1987.
[13] P. J. Davis, *Interpolation and Approximation*, Dover, N.Y., 1975.
[14] N. I. Achieser, *Theory of Approximation*, Dover, N.Y., 1992.
[15] G. B. Folland, *Harmonic Analysis in Phase Space*, Princeton University Press, Princeton, N.J., 1989.
[16] N. N. Lebedev, *Special Functions and their Applications*, Dover, N.Y., 1965.
[17] N. Wiener, *The Fourier Integral and Certain of Its Applications*, (Dover Publications, Inc., New York, 1958) originally Cambridge University Press, Cambridge, England, 1933.
[18] S. Thangavelu, *Lectures on Hermite and Laguerre Expansions*, Princeton University Press, Princeton, N.J., 1993.
[19] H. M. Ozaktas, D. Mendlovic, "Fractional Fourier Transforms and their Optical Implementation II," *Journal of the Optical Society of America*, A 10, pp. 2522-2531, 1993.

I claim:

1. An integrated optical information processing system comprising:
    an image source for providing optical image data, the image source comprising a light emitting diode (LED) array;
    a first non-quadratic phase optical element having a first side and a second side, the first non-quadratic phase optical element configured to accept the optical image data from the image source at the first side and to alter the optical image according to an imaging process, and to provide a first altered optical image from the second side of the first non-quadratic phase optical element;
    a plurality of light-modulating element arrays responsive to associated incoming light-modulating control signals associated with non-quadratic phase transfer functions, and adjacently stacked so that consecutive pairs of light-modulating element arrays are immediately adjacent with one another so as to form a stack with a first image passing surface at one edge of the stack and a second image passing surface at a second edge of the stack, the plurality of light-modulating element arrays arranged so that the first image passing surface receives the first altered optical image, the second image passing surface provides a second altered optical image;
    a second non-quadratic phase optical element arranged to receive the second altered optical image at a first of two sides; and
    an electronic image sensor facing the second of the two sides of the second non-quadratic phase optical element;
    wherein the optical image is directed through the first non-quadratic optical element, producing an optical field directed through the stacked plurality of light-modulating element arrays and subsequently directed through the second non-quadratic optical element and sensed by the electronic image sensor,
    the electronic image sensor to transform the second altered optical image into an electrical output.

2. The integrated optical information processing system of claim 1 wherein the electronic image sensor comprises an LED array.

3. The integrated optical information processing system of claim 1 wherein the optical information processing system is implemented as a monolithic integrated optical processor.

4. The integrated optical information processing system of claim 1 wherein the optical information processing system is implemented as a hybrid integrated optical processor.

5. The integrated optical information processing system of claim 1 wherein at least one of the first non-quadratic optical element and the second non-quadratic optical element comprises a lens.

6. The integrated optical information processing system of claim 1 wherein at least one of the first non-quadratic optical element and the second non-quadratic optical element comprises graded-index material.

7. The integrated optical information processing system of claim 1 wherein at least one of the incoming light-modulating control signals comprises information calculated by an associated processor.

8. The integrated optical information processing system of claim 1 wherein at least one of the incoming light-modulating control signals comprises information stored in an associated memory.

9. The integrated optical information processing system of claim 1 wherein at least one of the plurality of light-modulating element arrays is implemented with a liquid crystal display.

10. The integrated optical information processing system of claim 1 wherein at least one of light-modulating element arrays shifts a phase of light transmitted through it.

11. An integrated optical information processing system comprising:
- an image source for providing optical image data;
- a first non-quadratic phase optical element having a first side and a second side, accepting the optical image data at the first side, altering the optical image, and providing a first altered light from the second side;
- a plurality of light-modulating element arrays configured in a stack and responsive to associated incoming light-modulating control signals, the stack receiving the first altered light and providing a second altered light, and wherein at least one incoming control signals is associated with non-quadratic phase transfer functions;
- a second non-quadratic phase optical element arranged to receive the second altered light at a first side; and
- an electronic image sensor operating as an optical observation element facing a second opposite side of the second optical element;
- wherein the optical image is directed through the first non-quadratic phase optical element, producing an optical field directed through the stacked plurality of light-modulating element arrays and subsequently directed through the second optical element and sensed by the electronic image sensor, and
- wherein the image sensor transforms the second altered optical image into an electrical output, and
- wherein at least one of the image source and the electronic image sensor comprise a light emitting diode (LED) array.

12. The integrated optical information processing system of claim 11 wherein the electronic image sensor comprises a light emitting diode (LED) array.

13. The integrated optical information processing system of claim 11 wherein the optical information processing system is implemented as a monolithic integrated optical processor.

14. The integrated optical information processing system of claim 11 wherein the optical information processing system is implemented as a hybrid integrated optical processor.

15. The integrated optical information processing system of claim 11 wherein at least one of the first non-quadratic phase optical element and the second non-quadratic phase optical element comprises a lens.

16. The integrated optical information processing system of claim 11 wherein at least one of the first non-quadratic phase optical element and the second non-quadratic phase optical element comprises graded-index material.

17. The integrated optical information processing system of claim 11 wherein at least one of the incoming light-modulating control signals comprises information calculated by an associated processor.

18. The integrated optical information processing system of claim 11 wherein at least one of the incoming light-modulating control signals comprises information stored in an associated memory.

19. The integrated optical information processing system of claim 11 wherein at least one of the plurality of light-modulating element arrays is implemented with a liquid crystal display.

20. The integrated optical information processing system of claim 11 wherein at least one of the plurality of light-modulating element arrays shifts a phase of light transmitted through it.

* * * * *